United States Patent [19]

Ogawa

[11] Patent Number: 5,099,316
[45] Date of Patent: Mar. 24, 1992

[54] WHITE BALANCE ADJUSTING DEVICE

[75] Inventor: Takeshi Ogawa, Kanagawa, Japan

[73] Assignee: Canon Kabushiki Kaisha, Tokyo, Japan

[21] Appl. No.: 569,363

[22] Filed: Aug. 14, 1990

Related U.S. Application Data

[63] Continuation of Ser. No. 196,748, May 20, 1988, abandoned.

[30] Foreign Application Priority Data

May 30, 1987 [JP] Japan .................. 62-133351

[51] Int. Cl.$^5$ .................. H04N 9/04; H04N 9/64
[52] U.S. Cl. ................................. 358/41; 358/29
[58] Field of Search .............. 358/29 C, 41, 43, 44

[56] References Cited

U.S. PATENT DOCUMENTS

| | | | |
|---|---|---|---|
| 4,274,107 | 6/1981 | Tamura et al. | 358/29 |
| 4,700,219 | 10/1987 | Tanaka et al. | 358/29 C |
| 4,797,733 | 1/1989 | Takagi et al. | 358/29 C |
| 4,843,456 | 6/1989 | Iida et al. | 358/41 |

FOREIGN PATENT DOCUMENTS

26976 2/1982 Japan .
25597 2/1987 Japan .

Primary Examiner—Howard W. Britton
Assistant Examiner—Wendy B. Greening
Attorney, Agent, or Firm—Robin, Blecker, Daley & Driscoll

[57] ABSTRACT

A white balance adjusting device receptive of the color temperature of an object to be photographed for producing a plurality of gain control signals for adjustment of the white balance in plural channels is provided with a control circuit for correcting the gain control signals for white balance adjustment depending on whether or not values of the control signals in the respective channels are within respective predetermined ranges, wherein the levels of color signals are controlled in response to the corrected gain control signals.

16 Claims, 4 Drawing Sheets

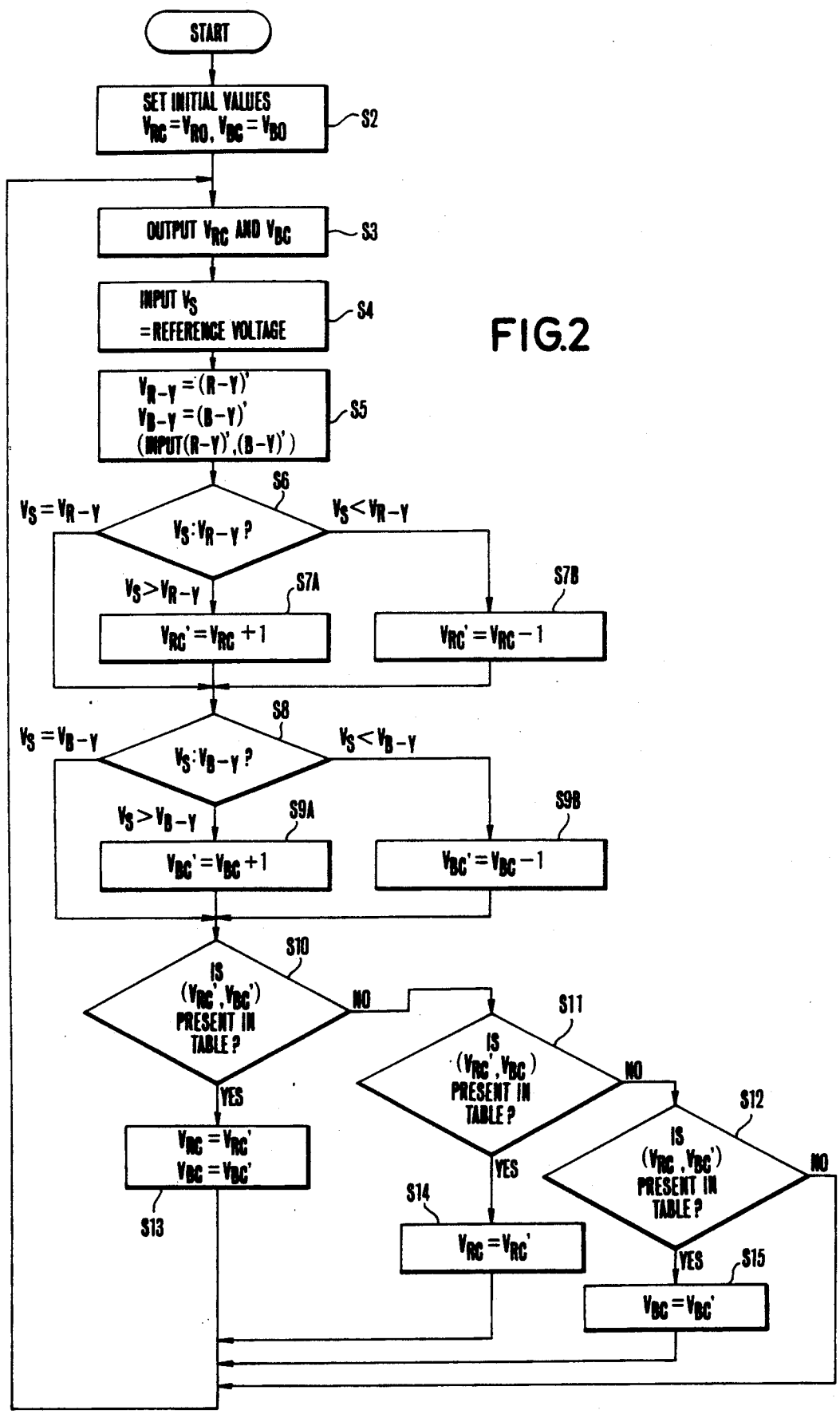

WHITE BALANCE ADJUSTING DEVICE

This application is a continuation, of application Ser. No. 196,748, filed May 20, 1988, now abandoned.

BACKGROUND OF THE INVENTION

1. Field of the Invention

This invention relates to a white balance adjusting device for automatically adjusting the white balance on the basis of the output signal from the image sensing element or the output signal from an external sensor.

2. Description of the Related Art

The technique of automatically adjusting the white balance on the basis of the output signal from the image sensing element or the external sensor is known. For example, the former method is to control the mu-factors of the R and B signals so that the integrated value of the color difference signal approaches the predetermined reference value.

In the case of adopting such a white balance adjusting method, a drawback is encountered in that when a colored object is very near, or an object lies in front of a colored wall such that a particular color occupies a large proportion of the area of the image frame, the white balance adjustment is caused to err so that the object image is in unnatural colors. Particularly the shift of color correction to green or cyan is very unpleasant to the human eye. In the art of automatic white balance adjustment, therefore, to remove such a drawback is regarded as a very important problem.

SUMMARY OF THE INVENTION

It is, therefore, an object of the invention, with the foregoing in mind, to provide a white balance adjusting device which has such a feature that the automatic white balance adjustment is always assured correct regardless of whatever situation the object to be photographed is disposed.

In an embodiment of the invention, the white balance adjusting device comprises a plurality of channels in which a corresponding number of gain control signals for white balance adjustment are formed according to the color temperature of an object to be photographed, and control means for correcting each of the control signals in the respective channels depending on whether or not values of the control signals fall within respective predetermined ranges, wherein the levels of color signals are controlled in response to the respective gain control signals.

According to the above-described embodiment, when the object color (other than the light source color) is detected, the white balance adjustment is not performed, but for the ordinary light source colors only, the white balance adjustment is done. By this, it is made possible to assure always correct white balance adjustment even for the compositions which occur in the closeup photography.

Other objects and features of the invention will become apparent from the following description and drawings.

BRIEF DESCRIPTION OF THE DRAWINGS

FIG. 2 is a flowchart for the program which the processor of FIG. 1(A) executes.

DETAILED DESCRIPTION OF THE PREFERRED EMBODIMENT

The present invention is next described in detail in connection with the embodiment thereof.

Figure 1A:
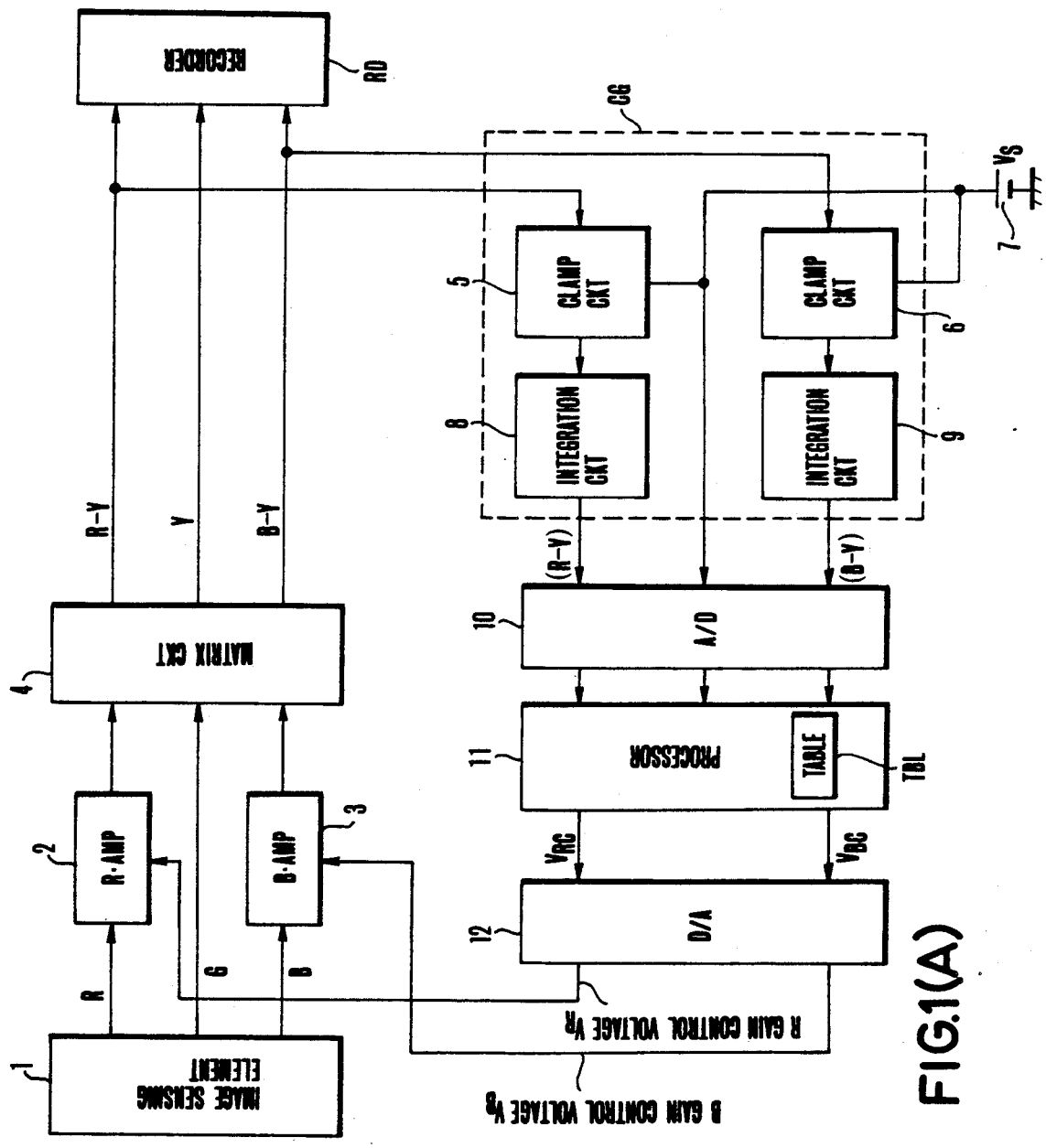
FIGS. 1(A) and 1(B) are block diagrams of an embodiment of the invention.

FIG. 1(A) is a block diagram illustrating an embodiment of a white balance adjusting device according to the invention. In this figure, an image sensing element 1 converts an optical image to an electrical signal. The R (red) signal from the image sensing element 1 is amplified by a variable gain amplifier 2 (hereinafter called "R amp"), and the B (blue) signal is amplified by another variable gain amplifier 3 (hereinafter called "B amp"). From the R, G and B signals produced from the image sensing element 1, a matrix circuit 4 makes up color difference signals R-Y and B-Y and a luminance signal Y. A recorder RD modulates, multiplies and records the outputs of the matrix circuit 4. The blanking levels of the color difference signals R-Y and B-Y are clamped to a reference voltage Vs by respective clamp circuits 5 and 6. A reference voltage source 7 produces the above-described voltage Vs. Two integration circuits 8 and 9 smooth the color difference signals R-Y and B-Y respectively. These circuits 5, 6, 8 and 9 constitute a control signal forming circuit CG. This circuit CG may otherwise be constructed as, for example, shown in FIG. 1(B), comprising logarithmic amplifiers 16-18 for producing outputs representing the logarithms of the outputs of the R, G and B color sensors 13 to 15 respectively, and two subtractors 19 and 20 for producing outputs representing log R/G and log B/G. These outputs of log R/G and log B/G can be used in replacement of those of (R-Y)' and (B-Y)' respectively. WP denotes a white diffusion plate positioned in front of all the color sensors 13–15. An A/D converter 10 converts the outputs (R-Y)' and (B-Y)' from the integration circuits 8 and 9 to digital signals. A processor 11 operates according to the flowchart of FIG. 2. A ROM table TBL previously stores an allowable range of white balance adjustment, which will be described in detail in connection with FIG. 3. The digital signals $V_{RC}$ and $V_{BC}$ produced from the processor 11 are converted by a D/A converter 12 to respective analog signals in the form of gain control voltages $V_R$ and $V_B$. By these gain control voltages $V_R$ and $V_B$, the gains of the R and B amps 2 and 3 are set.

Figure 3:
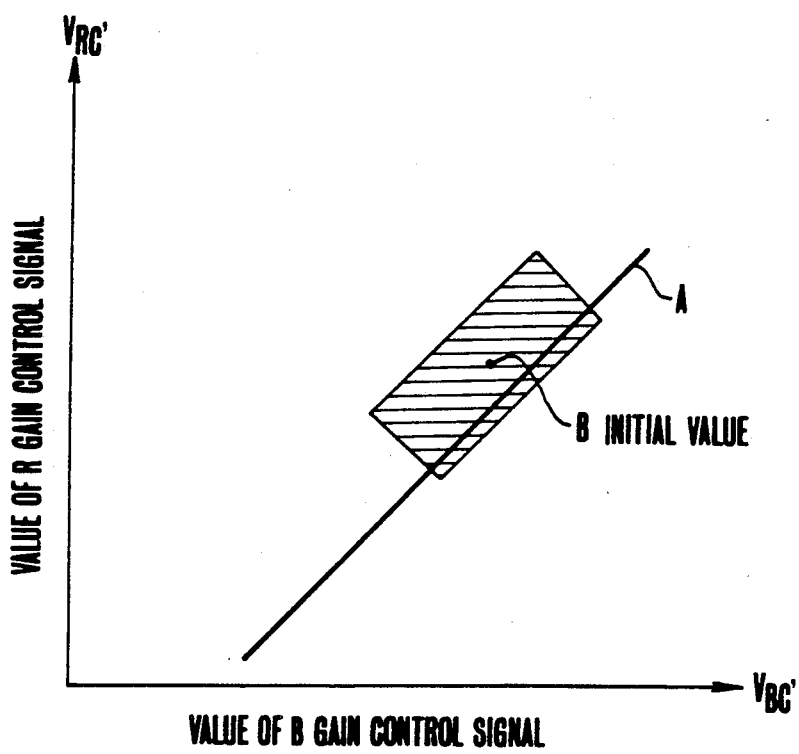
FIG. 3 is a graph explaining the content of the table (ROM) included in the processor.

FIG. 2 in flowchart shows the program the processor 11 should execute, and FIG. 3 is a diagram for explaining the ROM table TBL memorized in the interior of the processor 11.

The flowchart of FIG. 2 is next explained by reference to FIGS. 1(A), 1(B) and FIG. 3.

At first, in order to set the initial gains of the R and B amps 2 and 3, the R gain control signal $V_{RC}$ for the R amp 2 and the B gain control signal $V_{BC}$ for the B amp 3 are initialized to values $V_{R0}$ and $V_{B0}$ (STEP S2, STEP S3). These initial values correspond to a point B shown in FIG. 3.

Then, the reference voltage Vs is read in (STEP S4). Further the outputs (R-Y)' and (B-Y)' of the integration circuits 8 and 9 are inputted to use as values $V_{R-Y}$ and $V_{B-Y}$ respectively (STEP S5).

In the next step S6, which of the integrated value $V_{R-Y}$ of one of the color difference signals and the reference voltage Vs is larger or smaller is tested. If Vs> $V_{R-Y}$ the R gain control signal $V_{RC}$ is incremented (STEP S7A). Conversely, if $V_S < V_{R-Y}$, the R gain control signal $V_{RC}$ is decremented (STEP S7B). When $V_S = V_{R-Y}$, the processor 11 permits the signal $V_{RC}$ to take the initial value as was previously set in STEP S2.

In STEP S8, the relationship in magnitude between the reference voltage $V_S$ and the integrated value $V_{B-Y}$ of the other color difference signal is examined. If $V_S > V_{B-Y}$, the B gain control signal $V_{BC}$ is incremented (STEP S9A). Conversely, if $V_S < V_{B-Y}$, the B gain control signal $V_{BC}$ is decremented (STEP S9B). When $V_S = V_{B-Y}$, the signal $V_{BC}$ that the processor 11 produces is maintained at the initial value previously set in STEP S2.

After that, whether or not the values $V_{RC}'$ and $V_{BC}'$ set in the STEP 7A or 7B and STEP 9A or 9B are included within the hatched area in FIG. 3 is tested (STEP S10). If so, these values $V_{RC}'$ and $V_{BC}'$ are outputted without any alteration to use as the signals $V_{RC}$ and $V_{BC}$ (STEP S13).

On the other hand, if the point specified by the aforesaid values $V_{RC}'$ and $V_{BC}'$ falls outside the hatched area of FIG. 3, then test if only one of the values $V_{RC}'$ and $V_{BC}'$ lies in the range corresponding to the hatched area (STEPs S11, S12). If so, that value which lies in the range, $V_{RC}'$ or $V_{BC}'$, is outputted as the gain control signal $V_{RC}$ or $V_{BC}$ respectively (STEPs S14, S15). As to that value which lies outside the range, $V_{RC}'$ or $V_{BC}'$, the initial value $V_{R0}$ or $V_{B0}$ given in STEP S2 is preserved.

If "no" in either of the STEPs S11 and S12, in other words, both values $V_{RC}'$ and $V_{BC}'$ do not lie within the ranges corresponding to the hatched area of FIG. 3, both initial values $V_{R0}$ and $V_{B0}$ given in the STEP S2 are retained as they stand, and outputted as the gain control signals $V_{RC}$ and $V_{BC}$. Thus, it is made possible to limit the performance of the white balance adjustment only to the ordinary light source colors.

FIG. 3 is a graph illustrating an allowable range of adjustment of the white balance with the abscissa in the values $V_{BC}'$ of the B gain control signal, and the ordinate in the values $V_{RC}'$ of the R gain control signal. The solid line A in this graph represents the combined values of the R and B gain control signals necessary to compensate for the color of the light radiating from the black body as the light source. The hatched area, as has been described before, represents the allowable range of control memorized in the table TBL (see FIG. 1(A)). That is, this range of control allows for the white balance to be adjusted, concerning the light source colors ranging from that of the incandescent lamp to the outdoor light and to the slightly more than that greenish one of the fluorescent lamp.

Figure 1B:
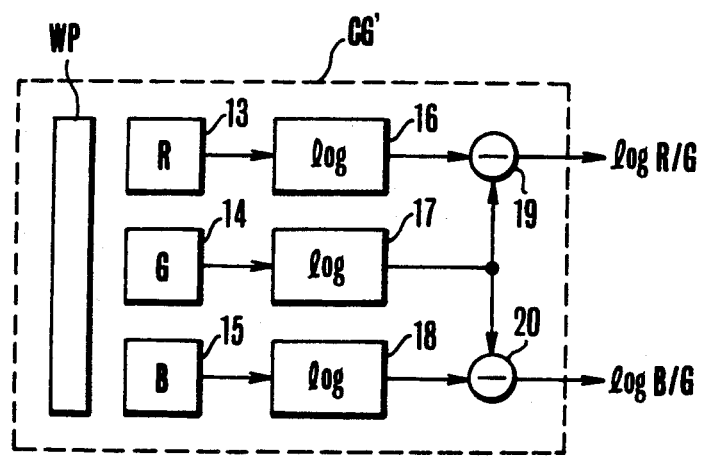

Though the foregoing embodiment has been described in connection with the image sensing element from which the R, G and B signals are obtained, these signals may otherwise be obtained without using the image sensing element, but by using the external sensor in separation as shown in FIG. 1(B). It is needless to say that even in this case, when similar limitations are laid on the combinations of the R and B gain control voltages, the adverse influence from the object colors (incorrect white balance adjustment) can be avoided.

As has been described above, in the invention, the arrangement is made that the white balance is permitted to be adjusted only when the sensed light is determined to be from the usual light sources, while when the object color (other than the light source color) is detected, the white balance adjustment is hindered from occurring. This produces an advantage that without suffering from the influence of the colors of the object, the white balance for the outputs of the image pickup device can be adjusted always correctly.

What is claimed is:

1. A white balance adjusting device comprising control means for forming a plurality of gain control signals for white balance adjustment in plural channels of color signals produced by image sensing means according to a color temperature of an object and correcting said gain control signals for white balance adjustment depending on whether or not a combination of values of said control signals in the respective channels is within a predetermined area in a space corresponding to all combinations of the values, the predetermined area being aligned with a line corresponding to combinations of the values for a black body radiation in the space, wherein the levels of the color signals are controlled in response to said gain control signals.

2. A device according to claim 1, wherein said control means includes detecting means for detecting information concerning the color temperature of the object.

3. A device according to claim 2, wherein said detecting means uses a plurality of color signals produced from said image sensing means for detecting the information concerning the color temperature.

4. A device according to claim 1, wherein said control means includes memory means for storing values corresponding to the predetermined area with which said control signals in the respective channels are to be compared.

5. An image sensing apparatus comprising:
   (a) image sensing means for converting an optical image to a plurality of electrical color signals;
   (b) control signal forming means for producing a control signal for controlling the balance between said plurality of electrical color signals;
   (c) discriminating means for discriminating whether or not the value of said control signal lies in a predetermined range, the predetermined range being determined on a basis of control signals for a black body radiation; and
   (d) correcting means for correcting the balance between said plurality of electrical color signals in accordance with the discrimination result of said discriminating means.

6. An apparatus according to claim 5, wherein said control signal forming means includes detecting means for detecting formation concerning the color temperature of an object.

7. An apparatus according to claim 6, wherein said detecting means uses a plurality of color signals produced from said image sensing means for detecting the information concerning the color temperature.

8. An image sensing apparatus comprising:
   (a) image sensing means for converting an optical image to a plurality of electrical color signals;
   (b) gain varying control means for variably controlling gains of prescribed color signals to control the balance between said plurality of electrical color signals;
   (c) discriminating means for determining whether or not a combination of a plurality of said gains of the color signals lies in a predetermined area in a space corresponding to all combinations of the gains, the predetermined area being aligned with a line corresponding to combinations of the gains for a black body radiation in the space; and (d) control means for controlling part of said image sensing apparatus in accordance with the discrimination result of said discriminating means.

9. An apparatus according to claim 8, wherein said discriminating means includes memory means in which previously selected combinations of gains are stored.

10. An apparatus according to claim 9, wherein said memory means includes a ROM.

11. An apparatus according to claim 8, further comprising:

control signal forming means for producing a control signal corresponding to the color temperature of an object.

12. An apparatus according to claim 11, wherein said control signal forming means forms said control signal on the basis of said plurality of color signals.

13. An apparatus according to claim 8, wherein said control means controls said gain varying control means in accordance with the discrimination result of said discriminating means.

14. An apparatus according to claim 13, wherein said control means, responsive to the discrimination result that said combination of the gains does not lie in the predetermined area, makes the gains of said gain varying control means to be predetermined constant values.

15. An image sensing apparatus comprising:

(a) image sensing means for converting an optical image to a plurality of electrical color signals;

(b) control means for forming a plurality of control signals which control gains of the plurality of color signals;

(c) discriminating means for discriminating whether or not a combinations of values of said control signals is within a predetermined area in a space corresponding to all combinations of the values, the predetermined area being limited by lines one of which is parallel in the space with a line corresponding to combinations for the values for a black body radiation in the space; and (d) correcting means for correcting the control signals in accordance with the discrimination result of said discriminating means.

16. An image sensing apparatus comprising:

(a) image sensing means for converting an optical image to a plurality of color signals;

(b) control means for forming a plurality of control signals which control gains of the plurality of color signals; and (c) limiting means for limiting control signals within values a combination of which is within a predetermined area in a space corresponding to all combinations of the values, the predetermined area being aligned with a line corresponding to combination of the values for a black body radiation in the space.

* * * * *